United States Patent [19]
Chervenak et al.

[11] Patent Number: 5,236,499
[45] Date of Patent: * Aug. 17, 1993

[54] SPRAYABLE WALL SEALANT

[75] Inventors: Raymond R. Chervenak, Bristol, Va.; C. Dempsey Holstein, Princeton, W. Va.; Ronald L. Paxton, Bristol, Va.

[73] Assignee: Sandvik Rock Tools, Inc., Bristol, Va.

[*] Notice: The portion of the term of this patent subsequent to Aug. 26, 2006 has been disclaimed.

[21] Appl. No.: 715,680

[22] Filed: Jun. 14, 1991

Related U.S. Application Data

[63] Continuation-in-part of Ser. No. 400,005, Aug. 29, 1989, now U.S. Pat. No. 5,043,019.

[51] Int. Cl.$^5$ ............................................. C04B 12/04
[52] U.S. Cl. ..................... 106/612; 106/613; 106/618; 106/619; 427/421
[58] Field of Search ............... 106/612, 613, 618, 619; 427/421

[56] References Cited

U.S. PATENT DOCUMENTS

| | | |
|---|---|---|
| 49,708 | 9/1865 | Brown . |
| 55,545 | 6/1866 | Ransome . |
| 344,409 | 6/1886 | Schimmelpfeng . |
| 346,336 | 7/1886 | Wendling . |
| 1,101,823 | 6/1914 | Weithaler ............... 427/427 |
| 1,541,606 | 6/1925 | Wert . |
| 1,742,794 | 1/1930 | Storey et al. . |
| 2,162,387 | 6/1939 | Radabaugh . |
| 2,407,615 | 9/1946 | Moon et al. . |
| 2,440,941 | 5/1948 | Garriott ............... 106/618 |
| 2,695,850 | 11/1954 | Lorenz . |
| 3,782,984 | 1/1974 | Allemand et al. . |
| 4,066,463 | 1/1978 | Chollet . |
| 4,132,555 | 1/1979 | Barrable . |
| 4,263,365 | 4/1981 | Burgess et al. . |
| 4,363,666 | 12/1982 | Johnson et al. . |
| 5,043,019 | 8/1991 | Chervenak ............... 106/612 |

FOREIGN PATENT DOCUMENTS

| | | |
|---|---|---|
| 2460543 | 1/1976 | Fed. Rep. of Germany . |
| 52-30528 | 4/1977 | Japan . |
| 53-21228 | 2/1978 | Japan . |
| 58-120555 | 1/1982 | Japan . |
| 59-227757 | 12/1984 | Japan . |
| 549442 | 4/1975 | U.S.S.R. . |
| 1537663 | 10/1979 | United Kingdom . |

OTHER PUBLICATIONS

Modern Plastics, Goldfein, Apr., 1965, p. 156.

Primary Examiner—Karl Group
Assistant Examiner—C. M. Bonner
Attorney, Agent, or Firm—Burns, Doane, Swecker & Mathis

[57] ABSTRACT

A sprayable composition for use as a sealant or coating for various surfaces, especially concrete block walls, is disclosed which includes water soluble silicate, water, cellulose fibers, clay and limestone. The cellulose fibers enable the sealant to have a sprayable consistency and good thixotropy when the sealant composition is sprayed on a vertical surface or a ceiling. A method of using the sealant composition also is disclosed.

28 Claims, No Drawings ized as 5,236,499

SPRAYABLE WALL SEALANT

This is a continuation-in-part application of Ser. No. 400,005, filed Aug. 29, 1989 now U.S. Pat. No. 5,043,010.

BACKGROUND OF THE INVENTION

Certain concrete and/or cinder block walls are made without mortar between the blocks. For example, concrete or cinder block walls in coal mines often are made without mortar. When no mortar is used, a coating over the surfaces of the wall may be used to add strength and integrity to the wall and/or reduce air flows through the wall.

Other substances, such as wood, iron, rock, minerals, coal and various plastics, used to support roofs, form ductwork, extend or form vertical surfaces or walls, or ceilings, also require coatings for fire retardant insulation against fire damage as well as to maintain or enhance the strength and integrity of the structure.

Typically, such coatings for concrete and/or cinder block walls are made of compositions containing water soluble silicates, water, clay and fiberglass. These compositions dry very slowly, particularly when the coating is very thick. The surface normally dries forming a silicate skin which then retards the drying. Further drying produces a thicker skin which further slows the drying. Attempts to increase the drying speed of the coating have resulted in cracking of the coating, which causes the coating to be ineffective as a sealant. The coating is less effective when cracked because it then imparts less flexural strength to the concrete block wall and allows air flows through the wall.

A further problem with these coatings is that the fiberglass in the coating material is an irritant to skin and eyes which causes the coating material to be difficult to handle.

A further problem with coatings for vertical surfaces is that many coatings suffer from sag when applied to the surface by spraying since the coating must contain enough liquid to have a sprayable consistency.

Thus, there is a need in the art for a sprayable sealant composition which can impart strength to a vertical surface and/or ceiling, will dry relatively quickly, is not irritating to handle and will provide a fire retardant insulation to the member coated.

SUMMARY OF THE INVENTION

The present invention relates to a sprayable sealant which includes a water soluble silicate, water, fibers, clay and limestone. In one aspect, the invention is directed to a sealant composition comprising, by weight, about 1.8 to about 28% water soluble silicate, about 3.6 to about 50% water, about 0.08% to about 5% fibers, up to about 50% clay and about 1 to about 73% limestone. Preferably, the fibers are cellulose fibers.

In another aspect, the invention is directed to a sprayable sealant composition comprising, by weight, about 6 to about 25% water soluble silicate, about 12 to about 48% water, about 1% to about 4% fibers, up to about 48% clay and about 2 to about 73% limestone.

In a further aspect, the invention is directed to a sprayable sealant composition comprising water soluble silicate, water, cellulose fibers, clay and limestone wherein the cellulose fibers are present in an amount effective to provide a sprayable consistency and sufficient thixotropy when the sealant composition is sprayed on a vertical surface or a ceiling.

In a further aspect, the invention is directed to a sprayable sealant comprising water soluble silicate, water, cellulose fibers and clay wherein the cellulose fibers are present in an amount effective to provide a sprayable consistency and sufficient thixotropy when the sealant composition is sprayed on a vertical surface or a ceiling.

There also is provided a method of coating vertical surfaces and/or ceilings using the sprayable sealant compositions of the invention.

DETAILED DESCRIPTION OF THE PREFERRED EMBODIMENTS

The composition of the present invention is useful as a sprayable sealant coating for various surfaces, particularly vertical surfaces or walls and ceilings. The surface may be wood, concrete, cinder block, iron, coal, rock or plastic, among others. The invention is particularly useful as a coating composition for concrete or cinder block walls made without mortar. The invention is even more particularly useful for concrete or cinder block walls made without mortar which are built in mines.

The sprayable sealant composition preferably is composed of, by weight, about 1.8 to about 28% water soluble silicate, about 3.6 to about 50% water, about 0.08% to about 5% fibers, up to about 50% clay and about 1 to about 73% limestone.

In the sprayable sealant composition of the invention, the water soluble silicate functions as a binder, giving strength to the product and helping to adhere the particles of the sealant composition. The water soluble silicate and at least a portion of the water are preferably present as an aqueous silicate solution. The aqueous silicate solution preferably contains about 30 to about 40% solids by weight of the total silicate solution. The water soluble silicates which may be used in the sealant composition include sodium silicate, potassium silicate, lithium silicate and quaternary ammonium silicates. The preferred water soluble silicate is sodium silicate. Use of sodium silicate results in an economical sealant composition since the cost is generally less than the other silicates.

In one embodiment of the invention, the sealant composition includes about 1.8 to about 28%, by weight, water soluble silicate. In a preferred embodiment, the water soluble silicate is present in an amount of from about 6 to about 25% by weight of the total amount of sealant composition.

The water in the sealant composition is a diluent which is used to adjust viscosity as well as lower the formula cost. The water may be added to the sealant composition separately or, where an aqueous silicate solution is used, the water in solution with the water soluble silicate may be the only water in the composition. In a preferred embodiment, a portion of the total water in the composition is in an aqueous silicate solution and a portion of the water is added separately. Water preferably is present in an amount of about 3.6 to about 50%. In a preferred embodiment, the sealant composition includes about 12 to about 48% water.

The fibers in the sealant composition serve as an additive to add strength and thixotropy to the sealant composition. These fibers are preferably non-allergenic fibers, such as polypropylene fibers, polyethylene fibers, or copolymers, alloys or mixtures of polypropylene and polyethylene and/or other polyolefins, polytetrafluoroethylene, fluorinated ethylene - propylene polymers, polychlorofluoroethylene polymers, nylon, polyester, polyaramid, copolymers of acrylonitrile (such as Orlon[198]), regenerated cellulose (such as Fortisan[198]) and other cellulose fibers, and the like.

The more preferred fibers for the composition of the invention are copolymers of acrylonitrile, nylon, cellulose or mixtures thereof. Cellulose fibers are particularly preferred. These cellulose fibers may be any type of cellulose, such as cellulose derived from wood or any other plant source including cotton, reclaimed cellulose, regenerated cellulose, and blends of the above. Due to cost advantages, the most preferred cellulose fiber is that obtained from reclaimed paper. However, from a practical point of view the other fibers work equally as well.

It has been found that cellulose fibers provide a surprising amount of strength in the sprayable sealant composition. While not wishing to be bound by any theory, it is hypothesized that this strength is due to the low interfacial tension between the sodium silicate and the cellulose. When the interfacial tension between a liquid and a solid is low, the adhesion between the two is enhanced. The higher adhesion is believed to produce a composite structure with greater strength.

The fibers useful in the sealant composition are commercially available. The minimum length of the fibers will be about 2 times its diameter (aspect ratio of 2). The maximum length of the fibers will not be a function of the fiber diameter. The minimum length is determined by the need to form a composite structure and thus add strength to the finished coating. This is usually achieved with a minimum aspect ratio of 2 or more if there is maximum adhesion between the fiber and the matrix. Cellulose fibers are typically 30 to 40 microns in diameter. Therefore the minimum length for cellulose fibers is 60 to 80 microns or 0.0024 to 0.0031 inches.

The maximum length of the fibers is determined by the minimum thixotropy needed and the ability of spray equipment to spray the sealant. The minimum thixotropy is achieved at lengths up to 0.25 inches. It is believed that the maximum length is determined by the constraints of the spray machine. It is possible that a spray machine could spray fibers that contained wholly or in part, fibers of 1 inch in length if they are thin and flexible. Thus the maximum length is indeterminant but is speculated to be on the order of 1 inch.

Preferably, the fibers will be about one-sixteenth of an inch to about one-quarter inch. This is sufficient to produce little or no sag when the sealant is sprayed to one to two inches thick without clogging the spray nozzle. With current spray equipment, longer fibers sometimes tend to clog a spray nozzle. Therefore, a larger quantity of shorter fibers generally is used to obtain strength in the sprayable sealant composition of the invention.

The fibers generally are present in an amount effective to provide a sprayable consistency and sufficient thixotropy when the sealant composition is sprayed on a vertical surface or ceiling. The spraying process subjects the sealant composition to severe forces when it breaks the sealant into small droplets, propels the droplets through the air, and the droplets impact the vertical surface or ceiling and coalesce to form a coating. The thixotropic nature of the sealant determines how rapidly the coalesced sealant thickens so as not to sag. On many surfaces, such as walls or ceilings in a coal mine, the sealant generally will be applied quickly. In a preferred embodiment, the sealant composition of the invention has a suitable consistency for spraying and after being applied by spraying, has sufficient thixotropy to substantially prevent sag, even up to a thickness of one to two inches.

The fibers generally will be present in an amount of from about 0.08 to about 5%, by weight of the total composition to obtain the required properties. In a preferred embodiment, the fibers are present in an amount of from about 1 to about 4%.

The fibers useful in the present invention generally do not cause skin irritation and provide an excellent bond to the water soluble silicate. It has been discovered that the degree of bonding between water soluble silicate and the fibers is greater than expected. This is an advantage of the sealant composition because this bonding increases the flexural strength of the coated surface, such as a concrete or cinder block wall. A wall of concrete block made without mortar, or dry-stack concrete block wall, has low flexural strength. By using the sealant composition of the present invention on a dry-stack concrete block wall, the wall can be made quite rigid with good flexural strength. The flexural strength of a concrete block with mortar, according to the Mine Safety and Health Administration, Department of Labor, is 39 lb/ft$^2$. The flexural strength of a wall coated with the sealant of the present invention is generally greater than 39 lb/ft$^2$. As exemplified below in Example 2, the flexural strength of a wall made without mortar and coated with the sealant composition of the present invention may have 4 $\frac{1}{2}$ to 5 $\frac{1}{2}$ times the flexural strength of a wall made with mortar.

The clay in the sealant composition is used as a texture filler, which gives body and smoothness to the composition. Since smoothness may not be required for certain applications, the clay component of the composition may be omitted. In that event, the limestone content generally will be increased. Since clay absorbs more water than limestone, the amount of water will be adjusted according to the respective amounts of clay and limestone present in the composition. Clays useful for the composition of the invention are known in the art. The clays which may be used include any hydrated aluminum silicate such as bentonite, kaolin or ball clay. A preferred clay for use in the sealant composition is ball clay which can be obtained from Kentucky-Tennessee Clay Co. The clay is present in the sealant composition in an amount of up to about 50%, by weight of the total composition. In a preferred embodiment, there is at least some clay in the composition to provide smoothness to the composition. An especially preferred minimum amount of clay is about 5% by weight, with a preferred maximum amount of about 48%.

The limestone of the sprayable sealant composition is a product modifier which speeds up the drying rate. While not wishing to be bound by any theory, it is believed that the drying process is accelerated because the limestone particles form a non-hygroscopic matrix within the hygroscopic clay/water/silicate system. This provides a porous pathway for the release of water in the sealant composition to the surface of the coating. The porous matrix of the limestone in the sealant thus allows the water in the sealant to move out of the coating more rapidly than in compositions not containing limestone. The drying is accelerated by use of the limestone but cracking is not induced as with other methods of drying acceleration. The amount of acceleration of drying will depend on the temperatures and humidities of the atmosphere in the area of the concrete block being coated with the sealant composition. However, the use of the limestone generally will decrease the time needed for drying by about 25 to about 60%. The limestone used in the composition may be any commercially available limestone. Preferred types of limestone include dolomite, calcite, marble or mixtures thereof. The most preferred limestone for the composition of the invention is dolomite. Generally, the limestone will be pulverized before it is added to the sealant composition. The limestone should be added to the sealant composition in an amount effective for accelerating the drying of the resultant sealant composition. In one embodiment, the limestone is included in the sealant composition in an amount of from about 1 to about 73% limestone. In a more preferred embodiment, the limestone is included in an amount of from about 2 to about 73%.

Other known filler materials may be used in the sealant composition such as talc, silica, feldspar and nepheline.

The sealant composition generally may be prepared by mixing the water soluble silicate with water and fiber and then adding about half of the clay and mixing until the clay is mixed in. The remainder of the clay may then be added and the mixture stirred until the clay is mixed in. The limestone then may be added to the mixture and the mixture stirred for 15 to 25 minutes. The resulting sealant composition may be packaged for marketing. The composition is stable and has a good shelf life. The composition may be stored from about six to about eight weeks.

A method for coating surfaces such as vertical surfaces or walls is provided which involves coating the surfaces with a sprayable sealant composition of the present invention. Any commercially available spray equipment may be used for applying the sealant composition. Spray equipment for spraying sealants used in mines is available and is characterized by the ability to handle the high consistency and high thixotropy of these sealants. One manufacturer of spray equipment is: A. L. Lee Corporation, P.O. Box 99, Lester, W. Va. 25865.

The following examples are provided to further illustrate the invention, but are not meant to limit the scope of the invention in any way.

EXAMPLES

EXAMPLE 1

Trowelable Sealant

A sealant composition was prepared by first adding 52.5 pounds of a binder, an aqueous sodium silicate solution containing 37.4% solids and a weight ratio of $SiO_2:Na_2O$ of 3.2:1, to a Hobart mixer. Ten pounds of water was then added to the mixer. A polypropylene (Hercules Inc., 15 denier, 10 mm long) fiber then was added to the mixer in an amount of 55 grams. The sodium silicate solution, water and fibers were mixed for six minutes. One half of the clay, or 28 pounds of ball clay, then was added. The solution was mixed until the liquids came to the top and then the remaining 28 pounds of clay was added. The liquids were thoroughly mixed until the liquids came to the top again. 4.5 pounds of dolomite limestone was blended into the solution for one minute. The total solution then was mixed for 18 minutes longer. The resulting sealant composition was packaged in five gallon pails.

Test Procedure

Three 4'×8' wall panels were constructed of standard 8" concrete blocks. The blocks were laid on top of each other to construct a panel approximately 4' wide ×8' high with a layer of the sealant composition of Example 1 coated on both sides of the panel. The thickness of application was 3/16" to 1¼".

The panels were build on 10"×50" wood pallets with spaces on the bottom so the panels could be lifted for testing. The 4'×8' panels were placed against one side of the test frame and was supported by two pipes approximately 6" from each end of the 8' wall. The remainder of the apparatus, which would apply the testing force, was placed against the 4'×8' wall. The contact with the wall was by means of two pipes four feet apart and two feet from each end of the 4'×8' wall. Force was applied via these contacts by means of a hydraulic cylinder. The force was measured by a pressure gauge calibrated to read force.

Test Results

The load as indicated was taken from the pressure gauge on the ram and jack assembly used for the force test. The clear span of the panels was 48"×78¼". This was used to compute the load per square foot.

The testing was conducted in accordance with ASTM Designation E 72-80, Standard Methods of Conducting Strength Tests of Panels for Building Construction.

The following are the results.

| Panel I.D. | Max. Load | Area Sq. Ft. | Pounds/Ft² |
|---|---|---|---|
| #1 - 3/16"-¼" Coating Both Sides | 2850 | 26.1 | 109 |
| #2 - 3/16"-¼" Coating Both Sides | 4500 | 26.1 | 172 |
| #3 - 3/16"-¼" Coating Both Sides | 4320 | 26.1 | 265 |
| | | Average | 149 |

EXAMPLE 2

Sprayable Sealant

A sprayable sealant composition with the following components was prepared:

| sodium silicate solution | 56% | 293 lbs. |
|---|---|---|
| water | 10% | 52 lbs. |
| 3/16" cellulose fibers | 2% | 10 lbs. |
| Ball clay | 29% | 150 lbs. |
| limestone | 3% | 17 lbs. |

The sodium silicate solution, water and fibers were mixed together for six minutes. The clay was added a bag (50 lbs.) at a time, mixing each bag in before the next bag was added. The limestone was added and the batch was mixed for about 20 minutes.

The sealant composition was tested as described in Example 1 after being applied by trowel to a thickness between 1/16 inch and 1¼ inch. The results for the three walls were as follows:

| #1 | 195 lbs./sq. ft. |
|---|---|

| -continued | |
|---|---|
| #2 | 170 lbs./sq. ft. |
| #3 | 222 lbs./sq. ft. |
| Avg. | 196 lbs./sq. ft. |

From the foregoing description, various modifications and changes in the composition and in the method of using such composition will occur to those skilled in the art. All such modifications or changes coming within the scope of the appended claims are intended to be included therein.

We claim:

1. A sealant composition comprising, by weight, about 1.8 to about 28% water soluble silicate, about 3.6 to about 50% water, about 0.08% to about 5% fibers, up to about 50% clay and about 1 to about 73% limestone, which composition is in a sprayable form.

2. The sealant composition of claim 1 wherein the fibers are copolymers of acrylonitrile, nylon, cellulose or mixtures thereof.

3. The sealant composition of claim 2 wherein the fibers are cellulose.

4. The sealant composition of claim 3 wherein the water soluble silicate is sodium silicate.

5. The sealant composition of claim 3 wherein the cellulose fibers are reclaimed paper fibers.

6. The sealant composition of claim 2 wherein the fibers are about 2 times the diameter of the fibers to about one inch in length.

7. The sealant composition of claim 6 wherein the fibers are about one-sixteenth inch to about one quarter inch in length.

8. The sealant composition of claim 2 wherein the limestone is dolomite, calcite, marble or mixtures thereof.

9. The sealant composition of claim 8 wherein the limestone is dolomite.

10. The sealant composition of claim 2 wherein the water soluble silicate and at least a portion of the water are present as an aqueous silicate solution which contains about 30 to about 40% solids.

11. A sealant composition comprising, by weight, about 6 to about 25% water soluble silicate, about 12 about 48% water, about 1% to about 4% fibers, up to about 48% clay and about 2 to about 73% limestone, which composition is in a sprayable form.

12. The sealant composition of claim 11 wherein the clay is present in an amount of about 5 % to about 48 %.

13. The sealant composition of claim 11 wherein the fibers are cellulose fibers.

14. The sealant composition of claim 13 wherein the water soluble silicate is sodium silicate.

15. The sealant composition of claim 13 wherein the cellulose fibers are reclaimed paper fibers.

16. The sealant composition of claim 13 wherein the cellulose fibers are about one-sixteenth inch to about one quarter inch in length.

17. The sealant composition of claim 13 wherein the limestone is dolomite, calcite, marble or mixtures thereof.

18. The sealant composition of claim 17 wherein the limestone is dolomite.

19. The sealant composition of claim 13 wherein the water soluble silicate and at least a portion of the water are present as an aqueous silicate solution which contains about 30 to about 40 % solids.

20. A sprayable sealant composition comprising water soluble silicate, water, cellulose fibers, clay and limestone wherein the cellulose fibers are present in an amount effective to provide a sprayable consistency and sufficient thixotropy when the sealant composition is sprayed on a vertical surface or a ceiling.

21. A sprayable sealant composition comprising water soluble silicate, water, cellulose fibers and clay wherein the cellulose fibers are present in an amount effective to provide a sprayable consistency and sufficient thixotropy when the sealant composition is sprayed on a vertical surface or a ceiling.

22. A method for coating vertical surfaces or ceilings comprising spraying said surfaces with a sealant composition comprising, by weight, about 1.8 to about 28% water soluble silicate, about 3.6 to about 50% water, about 0.08% to about 5% cellulose fibers, up to about 50% clay and about one to about 73% limestone.

23. The method of claim 22 wherein the water soluble silicate is sodium silicate.

24. The method of claim 22 wherein the limestone is dolomite.

25. The method of claim 22 wherein the water soluble silicate and at least a portion of the water present as an aqueous silicate solution which contains about 30 to about 40% solids.

26. The sealant composition of claim 2 wherein the water soluble silicate is sodium silicate.

27. The sealant composition of claim 11 wherein the water soluble silicate is sodium silicate.

28. The sealant composition of claim 11 wherein the limestone is dolomite, calcite, marble or mixtures thereof.

* * * * *